US007661139B2

(12) United States Patent
Dequevy

(10) Patent No.: US 7,661,139 B2
(45) Date of Patent: Feb. 9, 2010

(54) SYSTEM AND METHOD FOR DETECTING INVALID ACCESS TO COMPUTER NETWORK

(75) Inventor: Jean-Jacques Dequevy, Epinois (BE)

(73) Assignee: International Business Machines Corporation, Armonk, NY (US)

(*) Notice: Subject to any disclaimer, the term of this patent is extended or adjusted under 35 U.S.C. 154(b) by 849 days.

(21) Appl. No.: 11/221,961

(22) Filed: Sep. 8, 2005

(65) Prior Publication Data

US 2006/0085856 A1 Apr. 20, 2006

(30) Foreign Application Priority Data

Oct. 15, 2004 (EP) .................................. 04292461

(51) Int. Cl.
*G06F 11/00* (2006.01)
*G06F 7/04* (2006.01)
*H04L 9/00* (2006.01)
(52) U.S. Cl. .................... 726/23; 713/182; 713/183; 713/184; 713/185; 713/186; 726/24; 726/25; 726/26; 726/27; 726/28; 709/224; 709/225; 709/226; 709/227; 709/228
(58) Field of Classification Search ................... 726/23
See application file for complete search history.

(56) References Cited

U.S. PATENT DOCUMENTS 6,405,318 B1* 6/2002 Rowland .................... 726/22
2004/0125146 A1* 7/2004 Gerlach et al. ............. 345/772

* cited by examiner

*Primary Examiner*—Longbit Chai
(74) *Attorney, Agent, or Firm*—George R. McGuire; David R. Woycechowsky; Bond, Schoeneck & King, PLLC

(57) ABSTRACT

A method for detecting the invalid access to a computer network is disclosed. The method preferably operates in a computer network having computer servers operating on different operating systems and a plurality of computer devices. Each computer device is managed by a computer server at the operating system level. The computer network includes a plurality of information databases that contain information associated with the users and with the computer devices of the computer network. On each computer server, the method, system, and program generates a set of identifying files for each computer device managed by the computer server. All sets of identifying files from the plurality of computer servers are next gathered into a unique central violation database. Links are created between each set of identifying files and the plurality of information databases in order to determine a level of network access violation for each computer device. Violation messages for each computer device are generated based on the level of network access violation.

30 Claims, 5 Drawing Sheets

SYSTEM AND METHOD FOR DETECTING INVALID ACCESS TO COMPUTER NETWORK

CROSS REFERENCE TO RELATED APPLICATIONS

The present application claims priority to European Patent application No. 04292461.3, filed Oct. 15, 2004.

TECHNICAL FIELD

The present invention relates generally to computer systems security and more particularly to a system and method of detecting invalid attempts to log on to such computer systems to access a computer network.

BACKGROUND ART

In today's wide network enterprise, security has become a major concern to prevent unauthorized access to the many computer systems of the network. Computer systems within one business site are typically connected using a Local Area Network (LAN) and a Network Administrator is responsible for keeping the network up and running properly. As local area networks (LANs) continue to proliferate, and the number of personal computers (PCs) connected to LANs continue to grow at a rapid pace, network security becomes an ever increasing problem for network administrators. As the trend of deploying distributed LANs continues, this provides multiple access points to an enterprise network. Each of these distributed access points, if not controlled, is a potential security risk to the network. Among these risks, a virus attacks strongly impacts all IT infrastructures by the very fast spreading of the virus. A specific kind of virus is the well-known 'Worm'; one which makes use of security loopholes in operating systems and spreads from one system to another via networks through the standard TCP/IP ports 137, 139 and 445. Another risk is the volunteer attack and the unauthorized access to protected resources (also using spoofing).

Log files and other accounting mechanisms can be used to track users and their activities. Using log files and audit information is known as passive detection since these rely on a passive analysis set of data. The system administrators are responsible for reviewing the operating system security event logs to determine if a system attack or breach of security has occurred. Some known products allow administrators to review those logs, such as Tivoli Risk Manager from the Assignee and GFi LANguard S.E.L.M. from GFI Software Ltd.

Tivoli Risk Manager is based on a framework infrastructure allowing cross operating system availability (OS/2, Windows, Linux and AIX) to report the alerts on a centralized console. This solution offers the possibility for the administrator to create the appropriate relationships between various security alerts. However, the relationships concerning the Netbios invalid attempts between different operating systems are not deeply analyzed and do not relate to external databases.

GFi LANguard S.E.L.M. is a security event log monitor that collects all security events in one central database, creates reports and custom filters. This solution suffers from the limitation of operating on one Operating System only, namely Windows, thereby leaving attacks possible for others operating systems.

More generally, all existing solutions leave administrators with receiving a large number of false warning messages that compel spending a lot of time manually analyzing those messages and sorting out the non relevant violations from the true ones.

Therefore, there is a need for a solution that overcomes the aforementioned drawbacks. The present invention offers such solution.

SUMMARY OF THE INVENTION

Accordingly, the main object of the invention is to provide a system and achieve a method for improving computer system security by determining computer system invalid logon attempts. Particularly, the invalid logon attempts contain the Windows and the OS/2 Netbios bad logons (on TCP ports 137, 139 and 445), the Linux bad logons while accessing Samba resources, and the OS AIX logons.

It is another object of the invention to provide a unique central database to analyze the invalid logon attempts.

Another object of the invention is to provide a central database to manage any operating system violations.

A further object of the invention is a to offer a solution to easily and efficiently identify in an enterprise computer network the machines infected by WORM viruses.

Yet another object of the invention is to provide a solution involving less human resources to analyze computer system violation events thereby allowing fast proactive reaction.

Other objects of the invention will in part be obvious, and in part appear hereinafter.

According to an aspect of the present invention, a system is proposed for detecting the invalid access of a computer device to a computer network.

More generally, the method associated with the present invention preferably operates in a computer network having computer servers operating on different operating systems and a plurality of computer devices. Each computer device is managed by a computer server at the operating system level. The computer network includes a plurality of information databases that contain information associated with the users and with the computer devices of the computer network. The method generates on each computer server a set of identifying files for each computer device managed by the computer server. All sets of identifying files from the plurality of computer servers are then gathered into a unique central violation database. Links are created between each set of identifying files and the plurality of information databases in order to determine a level of network access violation for each computer device. Violation messages for each computer device are generated based on the level of network access violation.

In a commercial form, computer readable program means allowing a computer machine to perform the preferred method is embodied on a program storage device that is readable by the computer machine.

BRIEF DESCRIPTION OF THE DRAWINGS

The above and other objects, features and advantages of the invention will be better understood by reading the following Detailed Description of the invention in conjunction with the accompanying drawings wherein.

DETAILED DESCRIPTION OF THE INVENTION

Before referring to the figures, some general considerations as to the terms used and as to the advantages of the present invention are first highlighted:

A central analyzing tool (also named hereinafter central LogLooker) runs on a central analyzing machine. When run, the tool analyzes all the violations in one central database (named DBLOG hereinafter) that is continuously updated with information received from O/S servers. A local analyzing tool (also named hereinafter local LogLooker) is installed on each O/S server to run with the corresponding Operating System (OS/2, Windows, Linux or AIX).

Originator devices that create violation information into the local LogLookers are named attacker devices. Those attackers devices are identified inside the logs by their workstation names (or machine name referred to as <workstation> in the text).

The method of the present invention offers the advantage of analyzing the relationships existing between violations occurring on different local LogLookers. Moreover, the analysis of the violations may be advantageously linked to different databases, either internal to a company (e.g. Company Employee database) or external (e.g. list of authorized workstation names, list of authorized users, etc. . . . ).

Finally, it is to be appreciated that the present invention offers a global monitoring of system violations.

Different levels of warning are raised for the violations depending on the analysis of several criteria:

Determination of whether the access is made by an authorized or an unauthorized user;

Identification of a user creating a violation by searching for an identity into a company employee database;

Membership of a suspect list maintained by a Company (e.g. Administrator, Admin, Root, etc. . . . ) Referenced as a 'SPY' table;

The number of violations for one single userid;

The names of attacker devices for violations having a same userid;

The attacker device name for violations having a same originator device.

According to the result obtained by checking those different criteria, a level of violation is raised that may be:

'Low' for violations coming on the O/S servers from authorized userids;

'Medium' for violations having an unauthorized userid on the O/S servers;

'High' for violations having userids of members of the suspect list; and

'Inform' for violations coming from attacker devices considered as authorized to create violations (for self-test purposes or auto scanning for example).

Figure 1:
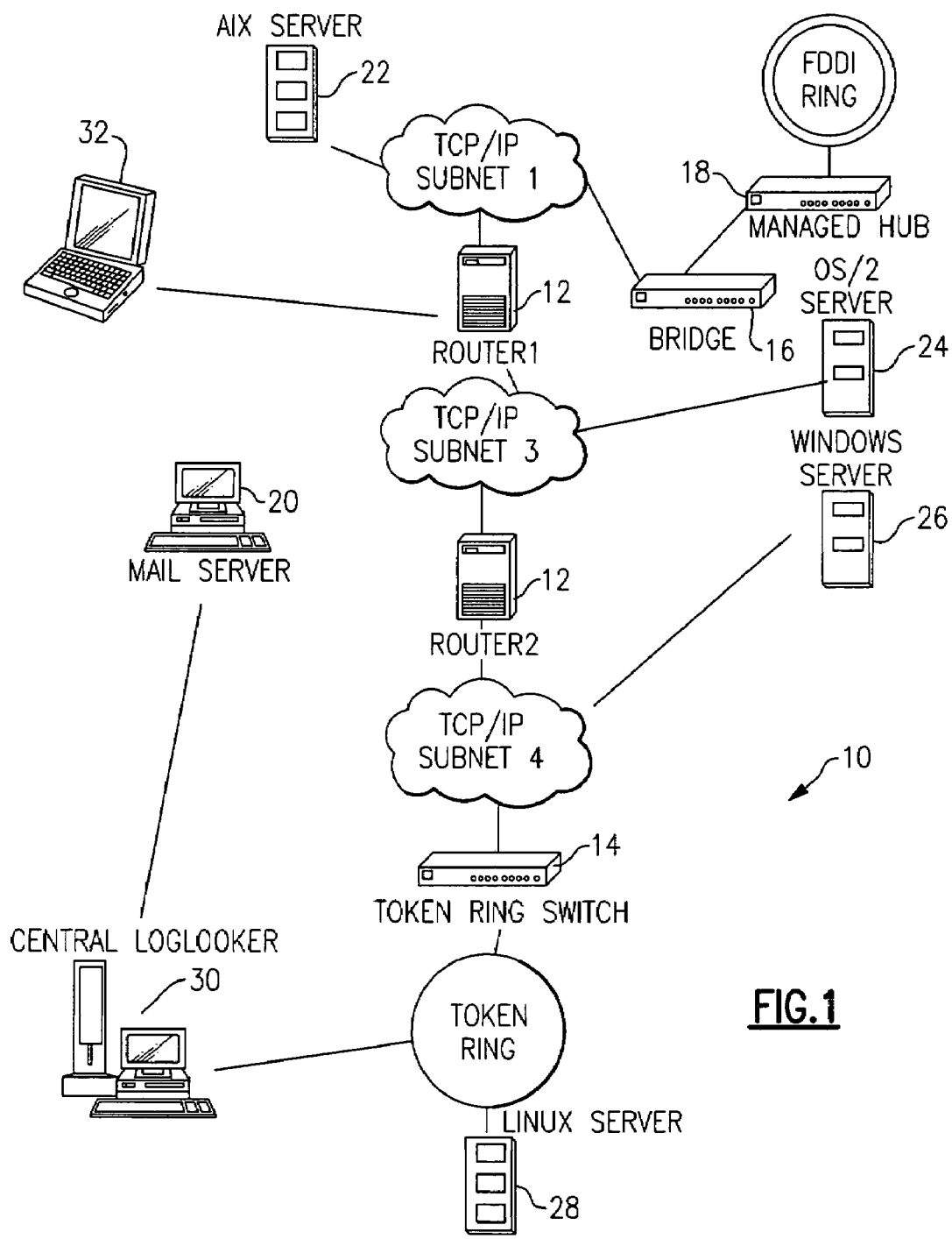
FIG. 1 is a general view of a computer system environment where to run the present invention.

Referring first to FIG. 1, there is shown a general view of a preferred environment to run the invention and that uses a FTP network management protocol. FTP is a common network protocol in the industry and is widely deployed in campus networks. As shown in the figure, the campus network 10 contains routers 12, token ring switch 14, bridge 16, managed hubs 18, mail server 20, O/S servers (AIX 22, OS/2 24, Windows 26, LINUX 28) and central analyzing machine 30. A personal computer 32 is shown coupled to the network via a Ethernet Switch 34 to illustrate an attacker device attempting to access the network. It is to be appreciated that the attacker device may be a workstation or a server or more generally any computer device being able to enter the network.

A local Loglooker is installed on each managed O/S server (22,24,26,28) which runs it regularly to send automatically the results files (sets of identifying files) to the central analyzing machine 30. It is to be noted that the frequency of the local LogLooker execution may be parametered for each O/S server.

A central Loglooker is installed on the central analyzing machine 30. This latter may be any computing device connected to a network entry point that is permitted to receive the FTP protocol. The central LogLooker runs in loop mode to systematically execute the following tasks:

make an inventory of the result files received from the local LogLookers;

store the result files content into a central violation database (DBLOG);

update an authorized employee database;

consolidate into a unique table (USERS) all userids defined from all local LogLookers;

start a correlation process between the userids and the information databases, to send the appropriate warnings to the administrator.

Thereafter, the process resumes automatically.

Figure 2:
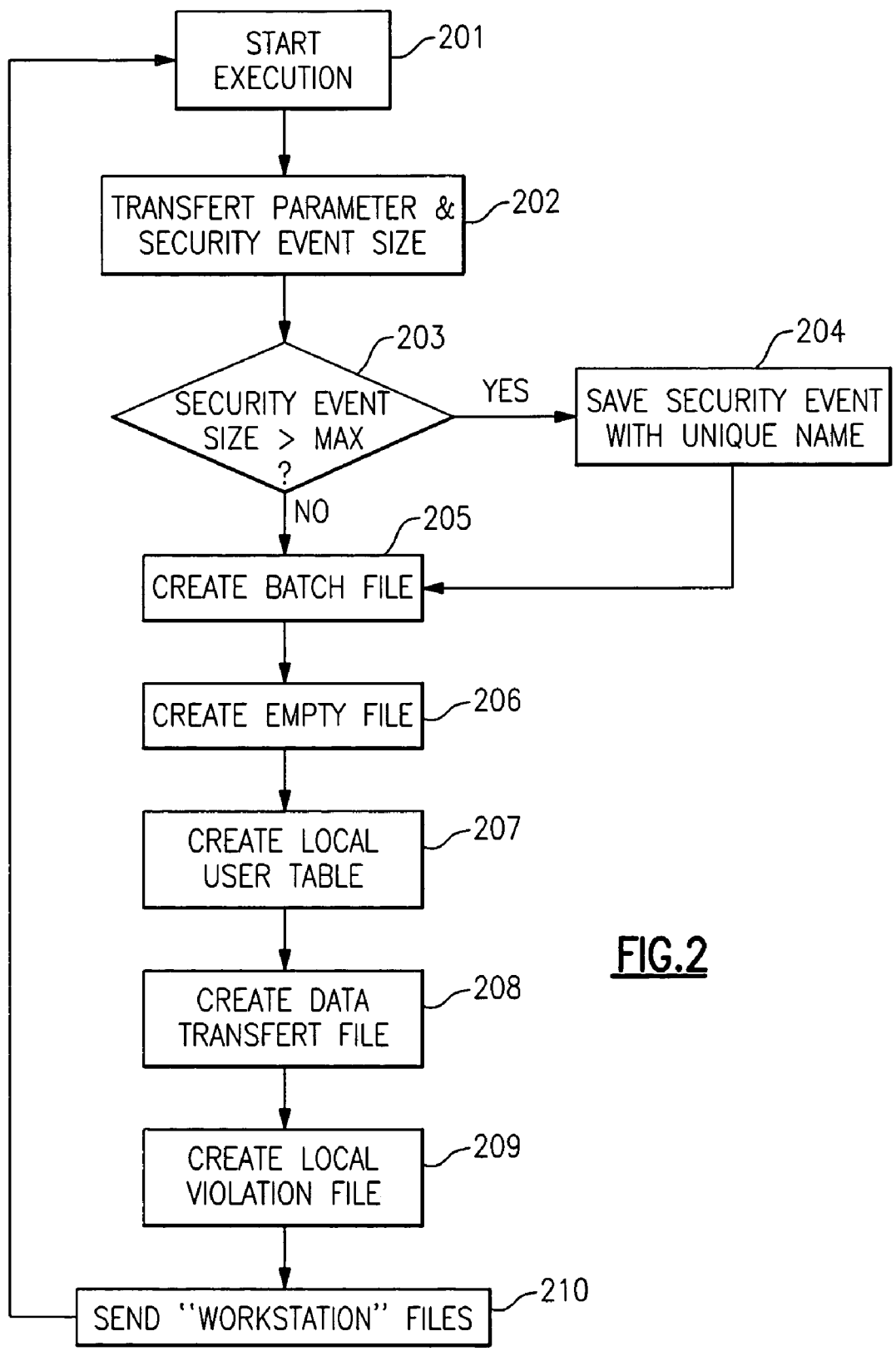
FIG. 2 is a flow chart of the main steps of the process of the invention run at a Windows O/S server.

Referring now to FIG. 2, there is illustrated the steps of a local LogLooker process run at an O/S server operating in a Windows environment (e.g., Windows 2000 Professional, Server 2000, Server 2003 or Windows XP Professional).

Step 201: The execution of the local LogLooker is scheduled via the Windows Task Scheduler.

Step 202: Several commonly used transfer parameters are extracted from the O/S server file (specifically the 'CONFIG.DBF' file), and particularly:

the IP address of the central LogLooker;

the FTP userid required for the FTP transfer towards the central LogLooker;

the FTP password required for the FTP transfer towards the central LogLooker;

the maximum size allowed for the Security Event log file (\%SYSTEMROOT%\system32\config\SecEvent.evt as it is well known by the skilled person).

Step 203: The current size of the Security Event log file is compared to the maximum size; and the date, time and the security event log size are recorded (preferably into a 'LOG' file).

The structure of the 'LOG' file is exemplified below:

| Name | Type | Width | Decimal |
|------|------|-------|---------|
| date | Data Time | 8 | |
| server | Character | 30 | |
| size | Numeric | 10 | 0 |
| cleaned | Character | 1 | |

Step 204: If the maximum size is reached, the content of the current Security Event Log file is saved with a unique name referring to the timing and location of the file (preferably in the form of '<workstation+date+month+day+hour+seconds>.evt'). Then the current file is cleaned.

Step 204 offers the following two advantages:

Log Reliability:

Managing the size of the current Security Event Log file ensures a full availability of the log and avoids the saturation of the file before the retention time is not reached.

Performances:

The cleaning operation of the Security Event file ensures a low impact on the CPU of the O/S servers and allow a very short duration of the execution.

Step 205: The local LogLooker creates a batch file which is generated at each execution of the local LogLooker procedure to execute next steps 206 to 207 in batch mode.

Step 206: An empty text file is created and generated at each execution of the local LogLooker procedure (preferably named <workstation.FLAG>. The value of the variable 'workstation' is automatically retrieved from the workstation name for the Operating system. As it will be fully explained below (on step 209), this empty file will be used by the central LogLooker.

Step 207: The local LogLooker extracts the information relative to the local users from the Operating System and creates a local userid table (preferably named '<workstation>.DBF' where 'workstation' refers as above to the workstation name for this O/S server.

The structure of this table is illustrated below:

| Name | Type | Width |
|---|---|---|
| user | Character | 64 |
| fullname | Character | 64 |
| descriptio | Character | 64 |
| status | Character | 10 |
| pw_expire | Character | 5 |
| pw_change | Character | 5 |
| pw_require | Character | 5 |
| lockout | Character | 5 |
| disabled | Character | 5 |

Step 208: a file containing the data that the FTP automatic transfer needs to run is created. Preferably the file is a text file including the central analyzing machine address, the userid and password for the logon FTP and the sending commands. This file is generated at each execution of the local LogLooker.

Step 209: the Security Event log file is read. All failed logons (considered as violations) and all revoked events are written into a local violation file (preferably named '<workstation>.txt' where 'workstation' refers to the workstation name for the O/S server).

Step 210: the files previously created on steps 204, 206, 207 and 209 are sent to the central analyzing machine via the FTP protocol. Preferably, the files are sent in the following order:

The '<workstation>.txt' file containing the bad-logons information (the violations);

The '<workstation+date+month+day+hour+seconds>.evt' file if it has been created in step 204;

The '<workstation>.DBF' file containing the local userid table; and

The '<workstation>.flag' empty text file.

The empty file is sent in last to ensure completion of the transfer of the other files.

The person skilled in the art will readily appreciate that the process of the local LogLooker is easily adapted for the Operating System supported by respective O/S server.

For example, for OS/2 servers, in a preferred implementation, the execution processes as follows:

The execution of the local LogLooker is scheduled via the well-known built-in 'TIMEXEC' function of the OS/2 Servers.

The other steps are identical to the process of FIG. 2 except that the various 'workstation' files created relate to the appropriate OS/2 server name.

At the end of the process, the created files are sent to the central LogLooker via the FTP protocol in the following preferred order:

The <workstation>.txt file containing the bad-logons information (the violations);

The <workstation+date+month+day+hour+seconds>.bkp security event log file if it has been created previously;

The '<workstation>.DBF' file containing the local userid table; and

The <workstation>.flag empty text file.

For the Linux and the AIX Operating Systems, except the scheduling which is executed via the well-known 'crontab' command, all steps remain identical to the Windows procedure.

Figure 3A:
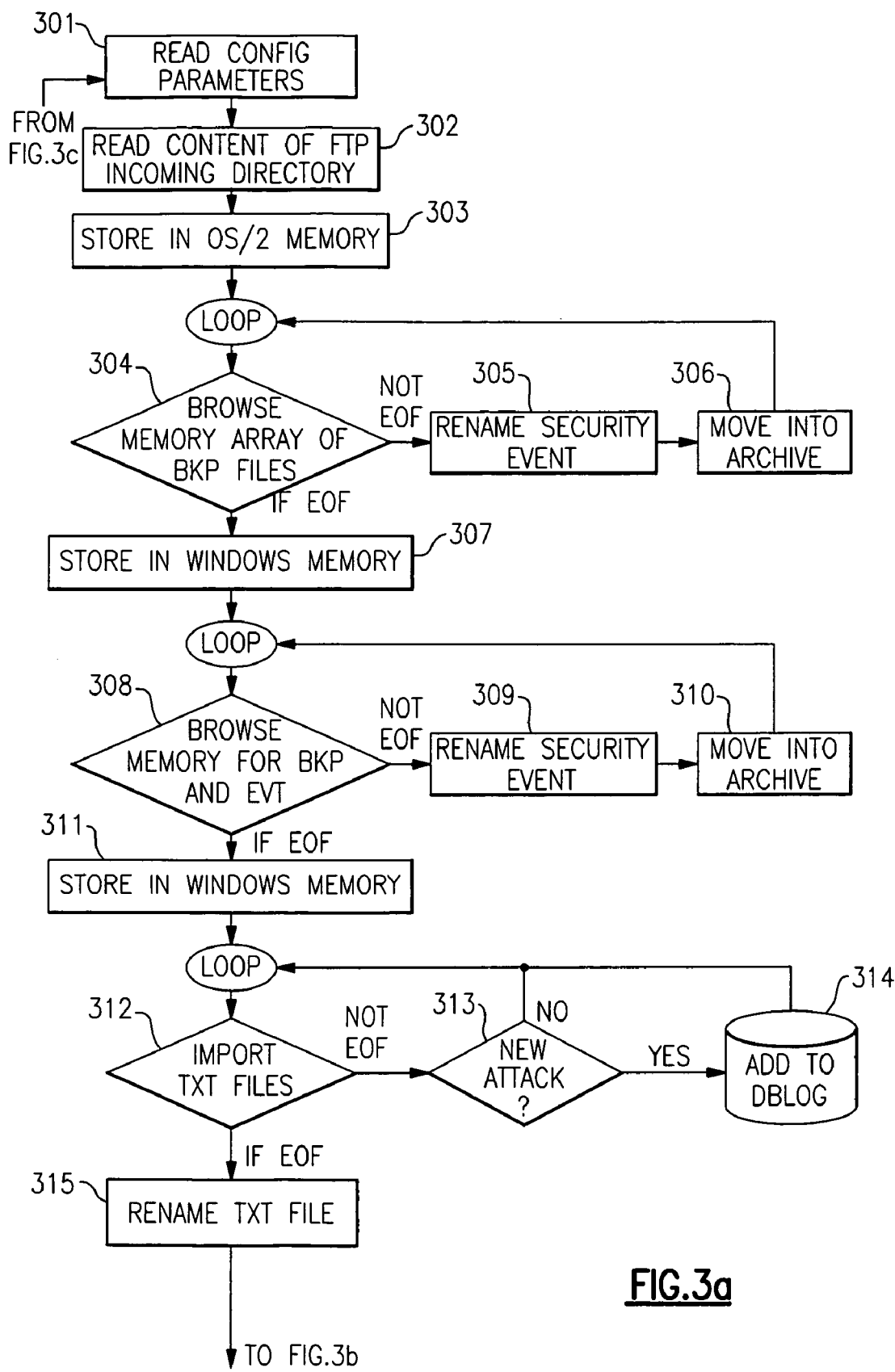
FIGS. 3-a to 3-c is a flow chart of the main steps of the process of the invention run at the central analyzing machine.
Figure 3B:
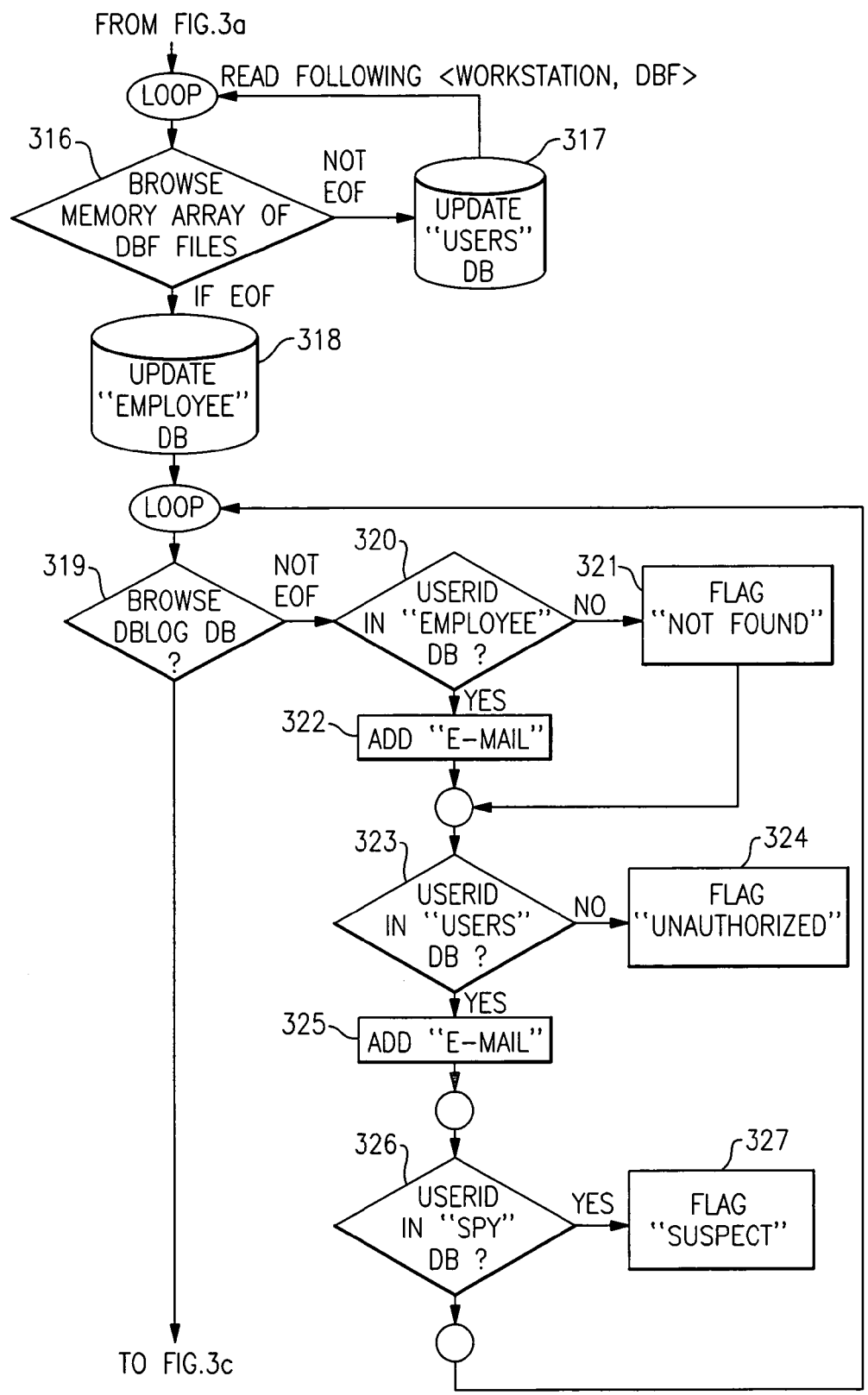
Figure 3C:
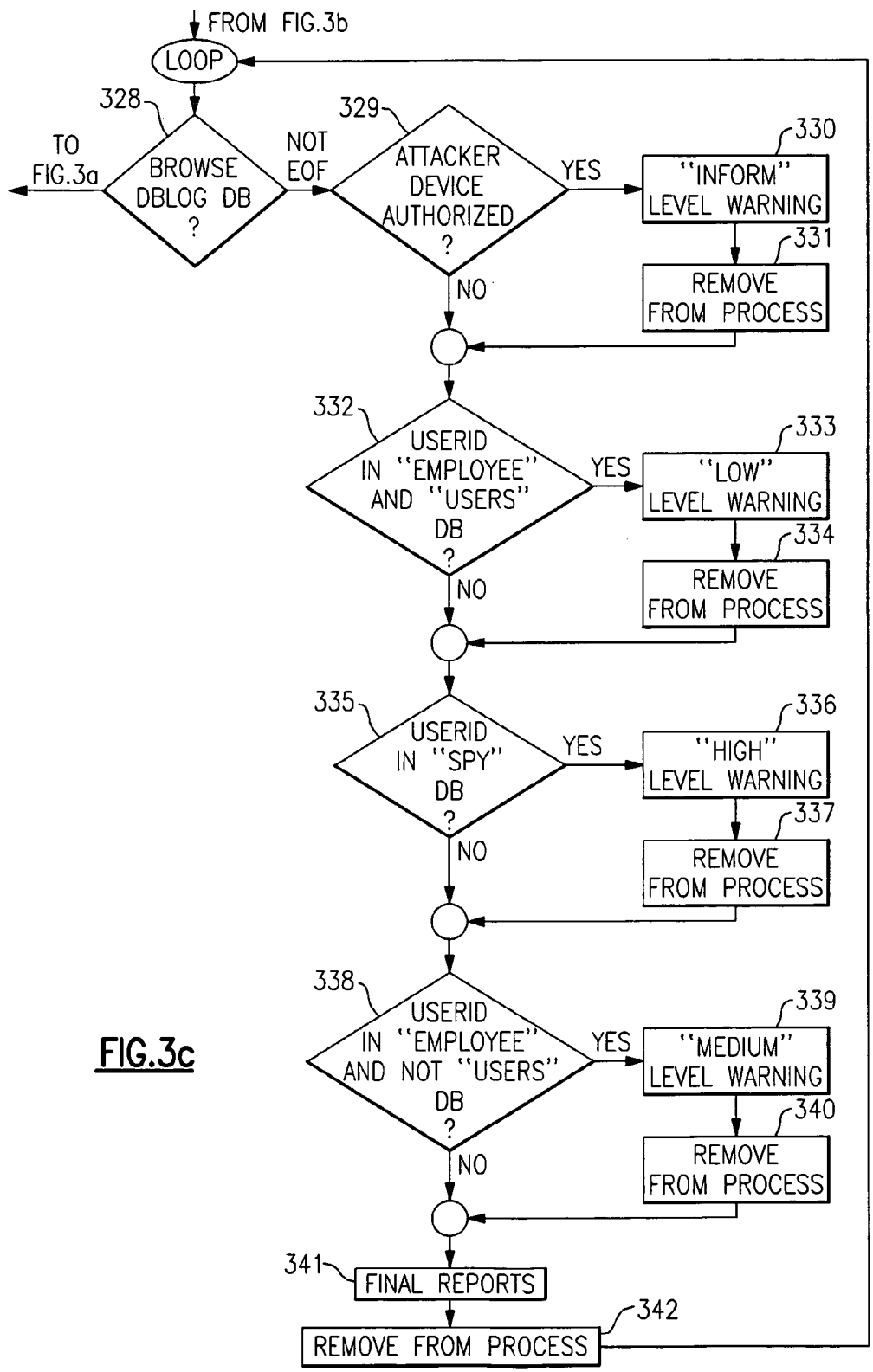

Referring now to FIGS. 3a to 3c, the process to be run at the central analyzing machine is now described.

Step 301: all configuration parameters are read:

the directories path (namely the working, the incoming and the archive directories);

the mail information where to send the alert mails (such as e-mail address of administrator and mail server address); and the execution frequency.

Step 302: all OS/2 '<workstation>.BKP' files having a correspondant '<workstation>.FLAG' file are read from the FTP incoming directory in order to avoid any uncompleted transferred file. This allows the local LogLookers to send their data without synchronization with the cycle of the central LogLooker.

Step 303: all read files are stored in a dedicated OS/2 memory area of the central analyzing machine.

Step 304: The process verifies the end of file of the memory array. If the end is reached, next step is 307; otherwise the process loops to steps 305 and 306.

Step 305: Each <workstation.BKP> file is renamed (by adding the month, date, hours, minutes and seconds) to declare one unique name for each file.

Step 306: All renamed '.BKP' files are moved from the incoming directory to an archive directory.

This is an important feature of the present invention to have all results and saved Event Log files archived. This ensures that, in case of a malicious update by a hacker of the original log file, a saved copy is available in a secure machine.

From step 307 to step 311: similar operations as for previous steps 302 to 306 are executed but for all '*.EVT' files issued from O/S servers operating on Windows.

Step 312: The '*.TXT' files are imported into a temporary violation database. This step collates into a same database the information extracted from different operating systems.

Step 313: Each violation is compared with the last recorded information existing in the central violation database 'DBLOG'.

Step 314: If the violation is newer than the content of the 'DBLOG.DBF' database for this local LogLooker and this userid, then the new record is added to the central database. Otherwise, the process loops to step 312.

The 'DBLOG' database is the violation database that contains all violations for all local LogLookers. Below is a figure to illustrate the structure of this database.

| | Name | Type | Width |
|---|---|---|---|
| | userid | Character | 32 |
| | date | Date | 8 |
| | datetime | DateTime | 8 |
| | server | Character | 32 |
| | workstatio | Character | 32 |
| | hostname | Character | 32 |
| | l_version | Character | 11 |
| | platform | Character | 11 |
| | checked | Character | 1 |
| | email | Character | 60 |
| | user | Character | 64 |
| | spy | Character | 1 |

Step 315: Each '<workstation>.TXT' file is renamed (by adding the month, date, hours, minutes and seconds) to have one unique name. Each renamed file is moved from the incoming directory to the archive directory. After this step, the '<workstation>.FLAG' file is deleted.

Step 316: all '<workstation>.DBF' files having a correspondant '<workstation>.FLAG' file are read from the FTP incoming directory to avoid any uncompleted transferred file. Those files are stored into a dedicated memory area.

Step 317: a 'USERS' database related to all local LogLookers is created from the files previously stored. Below is an illustration of the 'USERS' database:

| | Name | Type | Width |
|---|---|---|---|
| | user | Character | 64 |
| | fullname | Character | 64 |
| | descriptio | Character | 64 |
| | status | Character | 10 |
| | pw_expire | Character | 5 |
| | pw_change | Character | 5 |
| | pw_require | Character | 5 |
| | lockout | Character | 5 |
| | disabled | Character | 5 |
| | server | Character | 32 |

Step 318: the 'employee' database is updated. The purpose of this database is to identify the userid of the employee recorded in the violation database. An illustration of the employee database is shown below:

| | Name | Type | Width |
|---|---|---|---|
| | name | Character | 30 |
| | form | Character | 30 |
| | phone | Character | 60 |
| | userid | Character | 20 |
| | userida | Character | 20 |
| | email | Character | 60 |
| | notesid | Character | 20 |
| | internet | Character | 60 |
| | empnum | Character | 20 |
| | dept | Character | 20 |
| | manager | Character | 20 |
| | secretair | Character | 20 |
| | jobrespons | Character | 60 |
| | loccity | Character | 60 |
| | office | Character | 60 |
| | node | Character | 60 |
| | emptype | Character | 20 |
| | empcc | Character | 3 |
| | fname | Character | 60 |

Step 319: the 'DBLOG' central database updated on step 314 with the imported information is browsed.

Step 320: a verification is made that the violation userid is linked to an existing entry of the 'employee' table.

Step 321: If this userid is not found in the 'employee' table, a flag 'Not found' is added in the violation record. This information is used to evaluate the level of warning.

Step 322: If the userid is found in the 'employee' table, the corresponding e-mail address is added to the violation record. The information may be used to contact the owner of the userid.

Step 323: a verification is made to check if the userid exists in the 'USERS' table and defined as an authorized user for the local LogLooker. This information is used to evaluate the level of warning. If the userid is normally defined, a lower weight is attributed to the violation and a 'low' violation warning is issued.

Step 324: if the userid doesn't have any right on the violated local LogLooker, a flag 'Unauthorized' is added in the 'DBLOG' table. The level of warning for this type of violation is considered as a medium one and a 'medium' warning is issued.

Step 325: if the userid exists on the local LogLooker violated machine, then the description field of the violation database 'DBLOG' is updated with the description of the userid existing into the local LogLooker.

Step 326: a verification is made to check if the userid is present in the suspect list of the 'SPY' table. This is one another important feature of the present invention. This table contains all default userids existing in Operating Systems as well as in applications (root, db2admin, administrator, teacher, etc. . . . ). This list is continuously updated. Those userids are used by most Worm viruses trying to copy themselves into the Servers.

Step 327: if the userid is found in the 'SPY' table, a 'found' information is added to the violation record. A high level of warning is attributed in the 'DBLOG' violation table.

Step 328: the 'DBLOG' table is read for the newest records.

Step 329: each name of an attacker device is compared with a list of devices names that are authorized by the company rules to be in violation. If the name is not found, next step is 332.

Step 330: if the name is found in the list of authorized device names, the administrator is informed of the details related to the found device name and an 'inform' level of warning is issued.

Step 331: Those authorized violations are removed from the foregoing analysis processing. And the process continues with step 332.

Step 332: The attacker userid is compared to the 'employee' table and to the 'USER' table. If not found, next step is 335.

Step 333: If the attacker userid exist in the two mentioned tables, the administrator is informed of the result of step 332 and a 'low' level warning is issued.

Step 334: Those low level violations are removed from the foregoing processing.

Step 335: The attacker userid is compared to the suspect 'SPY' table. If not found, next step is 338.

Step 336: If the attacker userid is found, the administrator is informed of the result of step 335, and a 'high' level of warning is issued. This high level warning contains all suspect bad-logons ordered by userids.

Step 337: Those high level violations are removed from the foregoing processing.

Step 338: The attacker userid is compared to the 'employee' table and to the 'USER' table. If the userid is found in the 'employee' table but not in the 'USER' table, next step is 339, otherwise the process goes to step 341.

Step 339: the administrator is informed of the result of step 338 and a 'medium' level warning containing all unauthorized bad-logons ordered by userids is issued.

Step 340: Those medium level violations are removed from the foregoing processing.

Step 341: All previous issued warnings (inform, low, medium, high) are collated and sorted to be grouped by attacker device names into final reports. The administrator is thus immediately aware that one attack is happening even though only one or two violations are done on several attacked devices. This correlation between the suspect identified userid and the other violations (even though if normal) clearly shows the suspicion of a virus attack.

Step 342: Those 'inform, low, medium and high' level violations are removed from the foregoing processing. The overall process restarts from step 301.

It is to be noted that the advantage of the present invention is to group all the violation information into one relational database for all Operating Systems allowing the previously described cross-checking. It is to be appreciated that many modifications may be made to the method, system, and computer product herein described without departing from the spirit of the invention.

What is claimed is:

1. A system for detecting invalid access of a plurality of computer devices managed at the operating system level by a plurality of computer servers including a first server and a second server, the system comprising:

first receiving means for receiving, over a computer network, a first set of local loglooker files from a first server;

second receiving means for receiving, over a computer network, a second set of local loglooker files from a second server; and means for gathering at least the first set of local loglooker files and second set of local loglooker files into a central loglooker database;

wherein:

the first and the second set of loglooker files include a list of non-authorized userids, a list of non-authorized computer devices and a suspect list;

the first server operates on a first type of operating system; the second server operates on a second type of operating system; and the first type is different than the second type.

2. The system of claim 1 wherein:

the first type is chosen from the following group: OS/2, Windows, LINUX or AIX; and the second type is chosen from the following group: OS/2, Windows, LINUX or AIX.

3. The system of claim 1 further comprising means for deeply analyzing the central loglooker database.

4. The system of claim 3 further comprising means for relating to external databases.

5. The system of claim 3 further comprising means for relating to external databases.

6. The system of claim 1 further comprising:

first creating means for creating a first set of links between the first set of local loglooker files and a plurality of information databases containing information associated with a plurality of users and with the plurality of computer devices;

second creating means for creating a second set of links between the second set of local loglooker files and the plurality of information databases; and means for determining a level of access violation for each computer device of the plurality of computer devices based at least in part upon the first set of links and the second set of links.

7. The system of claim 6 further comprising means for generating violation messages for each computer device of the plurality of computer devices based on the level of access violation.

8. The system of claim 1 wherein:

the first set of local loglooker files comprises:

a first logon attempt file including logon attempt information for the first server, and a first computer device file including at least: (i) respective computer device names for each computer device, of the plurality of computer devices, that are managed by the first server, and (ii) respective userid's for each computer device, of the plurality of computer devices, that are managed by the first server; and the second set of local loglooker files comprises:

a second logon attempt file including logon attempt information for the second server, and a second computer device file including at least: (i) respective computer device names for each computer device, of the plurality of computer devices, that are managed by the second server, and (ii) respective userid's for each computer device, of the plurality of computer devices, that are managed by the second server.

9. The system of claim 1 wherein:

the first set of local loglooker files further comprises a first empty text file; and the second set of local loglooker files further comprises a second empty text file.

10. The system of claim 1 further comprising:
means for updating an authorized employee database;
means for consolidating all userids defined from at least the first set of local loglooker files and the second set of local loglooker files into a unique table; and
means for starting a correlation process between the unique table and a plurality of information databases containing information associated with a plurality of users and with the plurality of computer devices.

11. A method for detecting invalid access of a plurality of computer devices managed at the operating system level by a plurality of computer servers including a first server and a second server, the method comprising the following steps (not necessarily in the following order):
receiving, over a computer network, a first set of local loglooker files from a first server;
receiving, over a computer network, a second set of local loglooker files from a second server; and
gathering at least the first set of local loglooker files and second set of local loglooker files into a central loglooker database;
wherein:
the first and the second set of local loglooker files include a list of non-authorized userids, a list of non-authorized computer devices and a suspect list;
the first server operates on a first type of operating system; the second server operates on a second type of operating system; and
the first type is different than the second type.

12. The method of claim 11 wherein:
the first type is chosen from the following group: OS/2, Windows, LINUX or AIX; and
the second type is chosen from the following group: OS/2, Windows, LINUX or AIX.

13. The method of claim 11 further comprising the following step:
deeply analyzing the central loglooker database.

14. The method of claim 13 further comprising the following step:
relating to external databases.

15. The system of claim 11 further comprising the following step:
relating to external databases.

16. The method of claim 11 further comprising the following steps (not necessarily in the following order):
creating a first set of links between the first set of local loglooker files and a plurality of information databases containing information associated with a plurality of users and with the plurality of computer devices;
creating a second set of links between the second set of local loglooker files and the plurality of information databases; and
determining a level of access violation for each computer device of the plurality of computer devices based at least in part upon the first set of links and the second set of links.

17. The method of claim 16 further comprising the step of:
generating violation messages for each computer device of the plurality of computer devices based on the level of access violation.

18. The method of claim 11 wherein:
the first set of local loglooker files comprises:
a first logon attempt file including logon attempt information for the first server, and
a first computer device file including at least: (i) respective computer device names for each computer device, of the plurality of computer devices, that are managed by the first server, and (ii) respective userid's for each computer device, of the plurality of computer devices, that are managed by the first server; and
the second set of local loglooker files comprises:
a second logon attempt file including logon attempt information for the second server, and
a second computer device file including at least: (i) respective computer device names for each computer device, of the plurality of computer devices, that are managed by the second server, and (ii) respective userid's for each computer device, of the plurality of computer devices, that are managed by the second server.

19. The method of claim 18 wherein:
the first set of local loglooker files further comprises a first empty text file; and
the second set of local loglooker files further comprises a second empty text file.

20. The method of claim 11 further comprising the following steps (not necessarily in the following order):
updating an authorized employee database;
consolidating all userids defined from at least the first set of local loglooker files and the second set of local loglooker files into a unique table; and
starting a correlation process between the unique table and a plurality of information databases containing information associated with a plurality of users and with the plurality of computer devices.

21. A computer program product embodied in a computer-readable storage medium having associated program code, when executed, results in a machine performing the functions of detecting invalid access of a plurality of computer devices managed at the operating system level by a plurality of computer servers including a first server and a second server, the product being stored on a medium readable by a computer and the product comprising:
first receiving code for receiving, over a computer network, a first set of local loglooker files from a first server;
second receiving code for receiving, over a computer network, a second set of local loglooker files from a second server; and
gathering code for gathering at least the first set of local loglooker files and second set of local loglooker files into a central loglooker database;
wherein:
the first and the second set of local loglooker files include a list of non-authorized userids, a list of non-authorized computer devices and a suspect list;
the first server operates on a first type of operating system; the second server operates on a second type of operating system; and
the first type is different than the second type.

22. The product of claim 21 wherein:
the first type is chosen from the following group: OS/2, Windows, LINUX or AIX; and
the second type is chosen from the following group: OS/2, Windows, LINUX or AIX.

23. The product of claim 21 further comprising analysis code for deeply analyzing the central loglooker database.

24. The product of claim 23 further comprising relating code for relating to external databases.

25. The product of claim 21 further comprising relating code for relating to external databases.

26. The product of claim 21 further comprising:

first creating code for creating a first set of links between the first set of local loglooker files and a plurality of information databases containing information associated with a plurality of users and with the plurality of computer devices;

second creating code for creating a second set of links between the second set of local loglooker files and the plurality of information databases; and determining code for determining a level of access violation for each computer device of the plurality of computer devices based at least in part upon the first set of links and the second set of links.

27. The product of claim 26 further comprising generation code for generating violation messages for each computer device of the plurality of computer devices based on the level of access violation.

28. The product of claim 21 wherein:

the first set of local loglooker files comprises:
- a first logon attempt file including logon attempt information for the first server, and
- a first computer device file including at least: (i) respective computer device names for each computer device, of the plurality of computer devices, that are managed by the first server, and (ii) respective userid's for each computer device, of the plurality of computer devices, that are managed by the first server; and the second set of local loglooker files comprises:
- a second logon attempt file including logon attempt information for the second server, and
- a second computer device file including at least: (i) respective computer device names for each computer device, of the plurality of computer devices, that are managed by the second server, and (ii) respective userid's for each computer device, of the plurality of computer devices, that are managed by the second server.

29. The product of claim 28 wherein:

the first set of local loglooker files further comprises a first empty text file; and the second set of local loglooker files further comprises a second empty text file.

30. The product of claim 21 further comprising:

updating code for updating an authorized employee database;

consolidating code for consolidating all userids defined from at least the first set of local loglooker files and the second set of local loglooker files into a unique table; and starting code for starting a correlation process between the unique table and a plurality of information databases containing information associated with a plurality of users and with the plurality of computer devices.

\* \* \* \* \*

UNITED STATES PATENT AND TRADEMARK OFFICE
CERTIFICATE OF CORRECTION

| | | |
|---|---|---|
| PATENT NO. | : 7,661,139 B2 | |
| APPLICATION NO. | : 11/221961 | |
| DATED | : February 9, 2010 | |
| INVENTOR(S) | : Jean-Jacques Dequevy | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1189 days.

Signed and Sealed this

Thirtieth Day of November, 2010

David J. Kappos
*Director of the United States Patent and Trademark Office*